No. 670,367. Patented Mar. 19, 1901.
H. BURNET.
BICYCLE SUPPORT.
(Application filed Jan. 22, 1901.)

(No Model.)

WITNESSES:
Louis Dieterich
L. Wintzell

INVENTOR
Hugh Burnet
BY
Fred G. Dieterich
ATTORNEY

UNITED STATES PATENT OFFICE.

HUGH BURNET, OF VICTORIA, CANADA.

BICYCLE-SUPPORT.

SPECIFICATION forming part of Letters Patent No. 670,367, dated March 19, 1901.

Application filed January 22, 1901. Serial No. 44,245. (No model.)

*To all whom it may concern:*

Be it known that I, HUGH BURNET, a citizen of the Dominion of Canada, residing at Victoria, in the Province of British Columbia, Canada, have invented a new and useful Bicycle-Support, of which the following is a specification.

Figure 7:
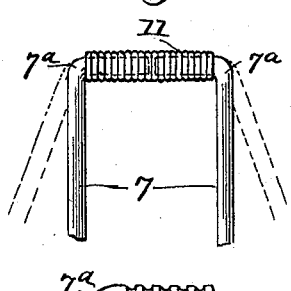

My invention relates to improvements in bicycle-supports in which I employ a clasp designed to be secured to the forward part of a bicycle-frame above the fork, said clasp being composed of a strap on its upper side and a support member beneath, having the lower edges of its opposite sides sloping inward toward the rear of the machine, and a hole through the upper side of the forward end of said member, in which is arranged a resilient joint connecting together the upper ends of supporting-legs, which legs may be integral with the resilient joint or may be connected by a coiled spring, as shown in Figure 7; and my object is to provide an adequate support for a bicycle that will prevent the front wheel from turning sidewise, that will hold the wheel in a rigid position by reason of its point of contact with the frame of the machine being above its center of gravity, and a device that when not in use may be folded backward, with the legs parallel to the frame to which it is attached. I attain this object by the mechanism illustrated in the accompanying drawings, in which—

Figure 1:
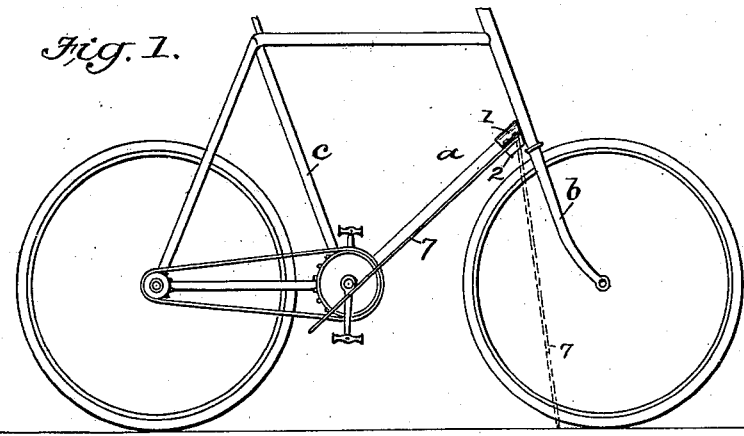
Figure 2:
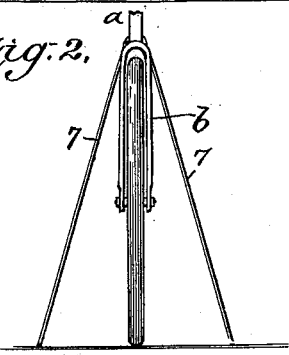
Figure 3:
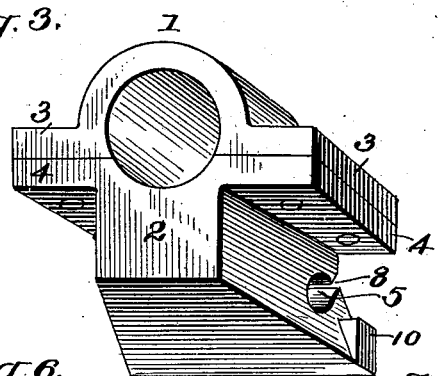
Figure 6:
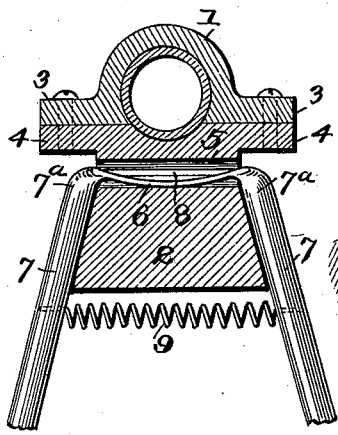
Figure 4:
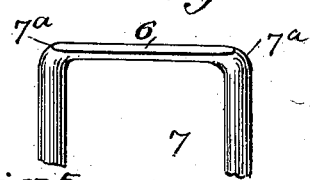
Figure 5:
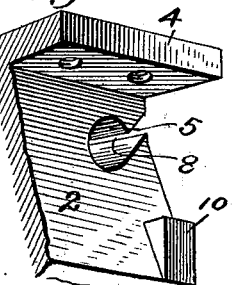

Fig. 1 shows a side elevation of a machine having my invention attached thereto. Fig. 2 is a view of the front of a bicycle with the support in position. Fig. 3 is a perspective view of the clasp carrying the support member for the legs. Fig. 4 is a detail of the resilient connection between the legs detached from their support. Fig. 5 is an enlarged detail of the support member, showing the angle of the slot for inserting the resilient connection of the legs into the aperture. Fig. 6 is an elevation of the legs, shown extended for the support of the bicycle, and also the support member sectioned through the aperture; and Fig. 7 shows a modified form of resilient member for connecting legs together.

Similar numerals and letters refer to similar parts in the several views.

As better shown in Figs. 3 and 4, my invention consists of a clasp formed in two pieces, top and bottom, 1 and 2, respectively, which are secured together by screws or bolts passed through the lateral flanges 3 and 4 on their opposite sides. This clasp is designed to be securely fixed when brought together by the screws or bolts to the forward end of the frame $a$, which connects between the fork-frame $b$ and the hanger $c$. The under side of the clasp, as 2, provides a support or holder for the legs and is formed with vertical sides projecting downward and sloping outward in a forward direction at their lower edges, (see Fig. 3,) so that such portion at its front end is much wider than at its rear end; but its upper edges adjacent to its flanges 4 are on parallel planes. Passing horizontally and at right angles through the forward end of this portion 2 is an aperture 5, designed to loosely receive a flattened resilient portion 6, connecting the legs 7 of the support together, which legs are turned at right angles to the flattened portion 6, as $7^a$. This flattened resilient portion 6 is of a length to correspond with the length of the hole 5 and is placed therein when the legs are turned at an angle forward through the slot 8, and, as better shown in Fig. 6, when the legs are turned vertically downward the member 6 is prevented from passing into the slot 8 by reason of same being depressed in the center owing to the legs being sprung outward. When the legs are turned backward and are out of action, the wide part of the flattened portion 6 will be presented over the slot 8, and therefore cannot pass through same. To further reinforce the resilient member 6, I employ a coiled spring 9, which connects the legs 7 together beneath the support 2. This may not be necessary, but is shown in case the spring 6 becomes weakened.

The ends of the legs at the bent portions $7^a$ are designed to lie close against the opposite vertical sides of the portion 2, and by reason of the resilient member lying loose in the aperture 5 said legs will be flexible to a limited degree, and when pushed forward to the position shown in dotted lines in Fig. 1 they will be spread out, as shown in Figs. 2 and 6, and form a convenient support for the machine.

When the legs are swung to the rear out of position, owing to the width reducing rearward on the member 2 they will at once be forced in by the resilient member 6, forming the connection, and the spring 9.

To properly hold the legs up close and parallel to the tube-frame $a$, I may employ a rubber band which can be slipped up or down the said frame as necessary, but which when the legs are in use will lie over the clasp. This is a matter, however, that does not affect my invention, as the legs are intended to be supported by the spring connection 6 and the spring 9, the tension of which always tends to draw them together and make their parallel sides hug the member 2 close beneath the flanges 4 when pressed backward.

To prevent the legs from going too far forward, I provide small projections 10 on the lower forward corners of the member 2, (see Figs. 3 and 5,) or this may be accomplished by pins instead, as is most convenient in the manufacture.

As shown in the modification, Fig. 7, I connect the legs 7 together in a flexible manner by a coiled spring 11, which is of a length to correspond with the length of the aperture 5 in the support 2. This spring is made from some resilient material closely wound, forming a tube to loosely lie in said aperture 5. The ends of the legs 7 are bent at right angles at $7^a$ and these portions threaded to correspond with the convolutions of the opposite ends of the spring 11, so that the horizontally-bent portions are screwed into the spring-coil, and by reason of the ends of such portions $7^a$ not being brought close together and the spring 11 being loose in the aperture 5 the legs 7 will have approximately the same flexible movement as when connected by an integral flat resilient portion.

From the foregoing it is seen that my invention is extremely simple, is cheap to manufacture, and may be applied to any bicycle and its chief advantage over the supports of this class is that its point of support is above the center of gravity in any bicycle to which it may be attached, which practically avoids the possibility of the machine being easily upset.

Having now described my invention, what I claim, and desire to be protected in by Letters Patent of the United States, is—

1. In a bicycle-support, a clasp consisting of members 1 and 2, said member 2 being of a wedge shape on its lower edges, sloping outward forwardly; an aperture 5 arranged horizontally through the forward upper side of the member 2, in combination with the legs or supports 7 having a horizontal flexible connection arranged to lie in the aperture 5, and projections or stop-pins projecting laterally from the lower opposite corners of the member 2 at its widest point, substantially as specified.

2. In combination, a clasp in two sections, the lower one projecting downward and having its lower sides wedge shape with respect to each other; an aperture in the forward upper side of said lower member; a resilient member in such aperture, and legs having their upper ends bent at right angles and fixed within such resilient member, and means for preventing said legs from being swung forward beyond a fixed point, as specified.

3. In a bicycle-support, a clasp having a lower depending portion with its lower edges deflected outward forwardly, but the upper portion of such depending portion of a parallel width and same width as its rear end; an aperture horizontally arranged at right angles through the forward upper part of the depending portion; a slot 8 angling downward connecting with such aperture, in combination with legs 7 arranged normally parallel to each other and having their upper ends connected together by a spring at right angles to such legs, which spring is designed to lie in the said aperture, substantially for the purposes set forth.

In testimony whereof I have hereunto signed my name to this specification in the presence of two subscribing witnesses.

HUGH BURNET.

Witnesses:
F. L. SWANNELL,
I. MARTIN SLY.